United States Patent [19]
Siu et al.

[11] Patent Number: 5,849,427
[45] Date of Patent: Dec. 15, 1998

[54] HYDRAULICALLY REFUELED BATTERY EMPLOYING A PACKED BED METAL PARTICLE ELECTRODE

[75] Inventors: Stanley C. Siu, Castro Valley; James W. Evans, Piedmont, both of Calif.

[73] Assignee: Lawrence Berkeley Laboratory, Berkeley, Calif.

[21] Appl. No.: 819,653

[22] Filed: Mar. 17, 1997

Related U.S. Application Data

[63] Continuation-in-part of Ser. No. 548,779, Oct. 26, 1995, abandoned, which is a continuation of Ser. No. 160,505, Dec. 2, 1993, abandoned.

[51] Int. Cl.⁶ .................................................. H01M 12/06
[52] U.S. Cl. .................................. 429/19; 429/17; 429/27
[58] Field of Search ................................. 429/27, 15, 17, 429/19, 101, 105

[56] References Cited

U.S. PATENT DOCUMENTS

| | | | |
|---|---|---|---|
| 3,981,747 | 9/1976 | Doniat et al. | 429/15 |
| 4,126,733 | 11/1978 | Doniat | 429/12 |
| 4,147,839 | 4/1979 | Solomon et al. | 429/15 |
| 4,218,520 | 8/1980 | Zaromb | 429/15 |
| 4,842,963 | 6/1989 | Ross, Jr. | 429/21 |
| 5,006,424 | 4/1991 | Evans et al. | 429/15 |
| 5,441,820 | 8/1995 | Siu et al. | 429/17 |

*Primary Examiner*—Anthony Skapars
*Attorney, Agent, or Firm*—Allston L. Jones

[57] ABSTRACT

A secondary zinc air cell, or another selected metal air cell, employing a spouted/packed metal particle bed and an air electrode. More specifically, two embodiments of a cell, one that is capable of being hydraulically recharged, and a second that is capable of being either hydraulically or electrically recharged. Additionally, each cell includes a sloped bottom portion to cause stirring of the electrolyte/metal particulate slurry when the cell is being hydraulically emptied and refilled during hydraulically recharging of the cell.

9 Claims, 7 Drawing Sheets

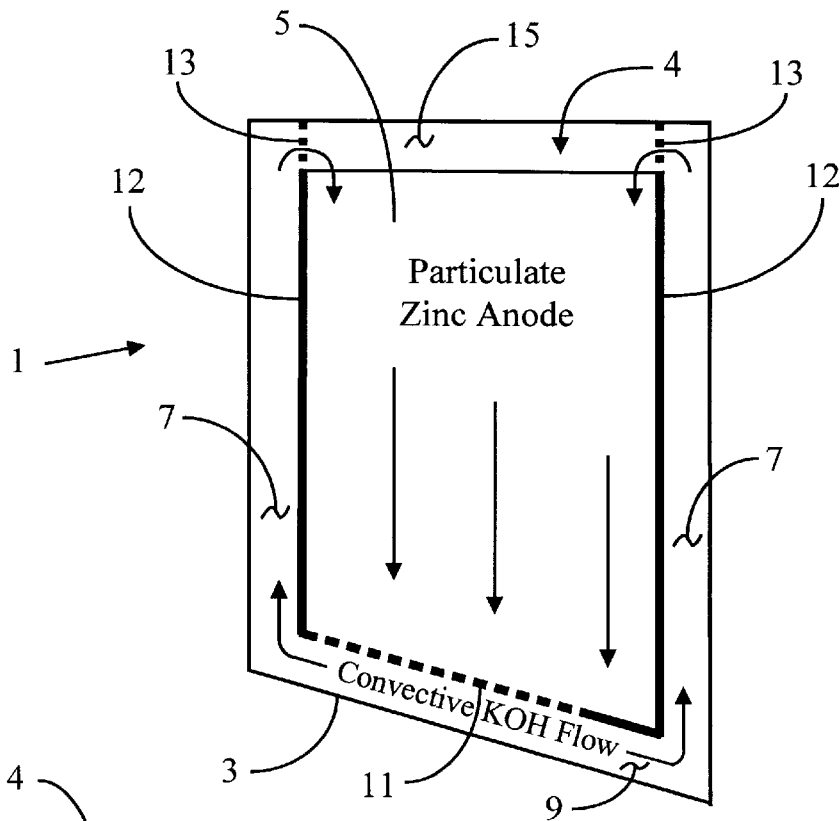
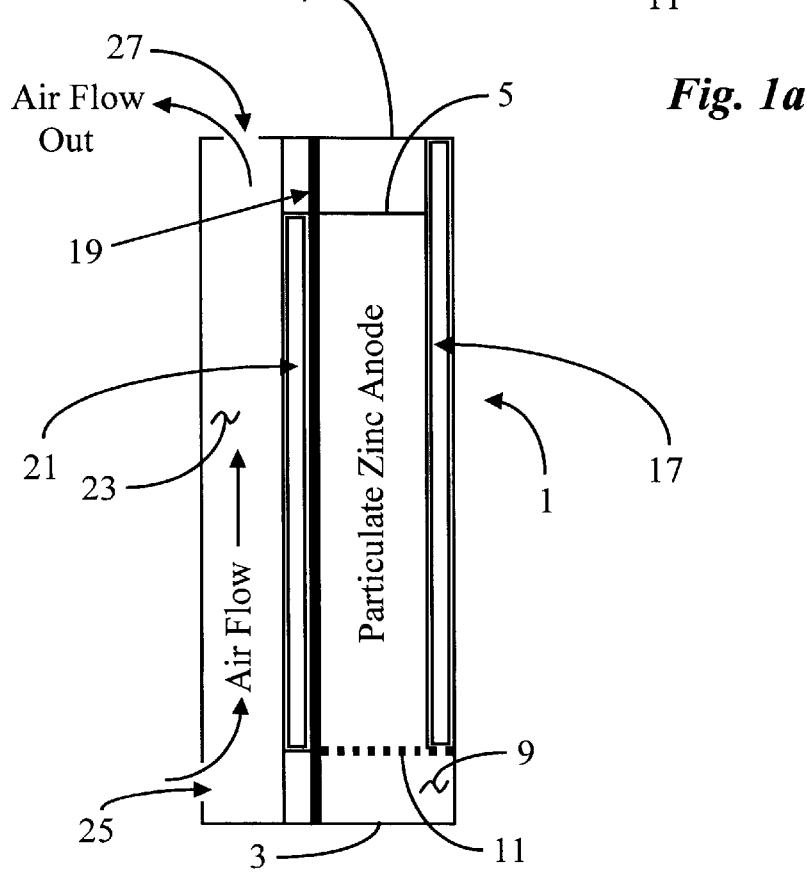
*Fig. 1a*
*Fig. 1b*

HYDRAULICALLY REFUELED BATTERY EMPLOYING A PACKED BED METAL PARTICLE ELECTRODE

CROSS REFERENCE

The present U.S. Patent application is a continuation-in-part application that is based on a previously filed application having Ser. No. 08/548,779 now abandoned, filed on Oct. 26, 1995, which in turn was a continuation application based on a previously filed application having Ser. No. 08/160,505 now abandoned, filed on Dec. 2, 1993.

GOVERNMENT RIGHTS

The invention described herein was made with Government support under Contract No. DE-AC03-76SF00098 between the U.S. Department of Energy and the University of California for the operation of Lawrence Berkeley National Laboratory. The U.S. government has certain rights in this invention as described in that contract.

FIELD OF THE INVENTION

The present invention relates to a rechargeable battery, in particular it relates to a cell which is capable of being hydraulically recharged in one embodiment, and either hydraulically or electrically recharged in another embodiment. More specifically the present invention relates to a method for hydraulically recharging a zinc-air cell having a zinc particle bed; or other metals that are capable of reaching a stable surface oxide in air or water, can form an aqueous solution of a metal salt and has a negative standard electrode potential (e.g., iron, aluminum, etc., excluding copper).

BACKGROUND OF THE INVENTION

There is a substantial and growing interest in the development and use of electric vehicles to alleviate the world's pollution problems and reduce the use of nonrenewable fossil fuels. The biggest problem in the development of such vehicles has been the inadequacy of conventional batteries to provide the energy required by such vehicles.

Zinc-air primary (non-rechargeable) cells and secondary (rechargeable) zinc-air cells are well known in the art.

A problem with currently available zinc-air systems is that pumps are required to recirculate the electrolyte through external loops during electrical discharge of the battery. This is a drawback since pumps consume a substantial amount of energy and add considerable weight to the battery. This makes the presently available zinc air cells poorly suited for electric vehicles as a large number of such cells are necessary to provide adequate power.

Ross, in U.S. Pat. No. 4,842,963, issued Jun. 27, 1989, describes a secondary zinc-air battery Which recirculates electrolyte through a porous foam electrode containing deposited zinc by means of an external pump and electrolyte reservoir.

Each of the three U.S. Patents by Doniat, et al. (U.S. Pat. No. 3,887,400 issued Jun. 30, 1975; U.S. Pat. No. 3,981,747 issued Sep. 21, 1976 and U.S. Pat. No. 4,126,733 issued Nov. 21, 1978) provides another approach to rechargeable zinc-air cells. In the Doniat systems, electrolyte is passed upwardly through a zinc particle bed. Various techniques for electrochemically regenerating the zinc in situ are also described.

Solomon, et al., in U.S. Pat. No. 4,147,839 issued Apr. 3, 1979, describe a cell using a stirred metal powder and cell electrolyte slurry. While not requiring the use of a pump during electrical discharge to transfer electrolyte to and from the cell, the battery still must draw energy during discharge in order to drive the cell's agitator which in this case is a pitched impeller used to stir the mixture.

Savaskan and Evans, in U.S. Pat. No. 5,006,424 issued Apr. 9, 1991, describe a cell which has demonstrated promising electrical performance. Besides its electrical performance, this cell is attractive because it is "hydraulically" recharged. The zinc is present as particles and recharging consists of the hydraulic removal of reacted particles and electrolyte.

As described by Savaskan and Evans, recharging was accomplished by suctioning the particles out of the cell and refueling by pouring particles through a conduit in the top of the cell. On a laboratory scale, this method of recharging can be easily accomplished by hand using a siphon for emptying and pouring particles into the cell through a funnel. For electric vehicle purposes though, this method would prove impractical and inefficient given that there would conceivably be hundreds of cells to be emptied and refilled. Laboratory experiments indicate that any suctioning system would not be capable of removing all spent particles and that after a sufficiently deep discharge, the particles begin to stick together and a way to break up the agglomerated particles is needed.

Technology for emptying such a system has not advanced further than siphoning out the spent particles and electrolyte, opening a drain plug in the bottom of the cell and draining the contents, or opening the entire bottom of the cell and dropping out the contents. The first is impractical, the second inefficient, and the third too complex for commercial applications.

Technology for filling the cell is not much better than emptying it. Maintaining particle flow in an electrolyte is no small task; unless electrolyte flow is strictly controlled, filling a zinc-air battery would prove impossible. At low flow rates, particles will either not flow at all or they lose momentum and stay in the piping. Using too high a flow rate though, not only jets all the particles into the cell, it also jets them out of the cell, or optimistically, fills up the cell as well as the reservoir chambers which is detrimental to the solutal natural convective process during discharge and is therefor undesirable. Previous experience with flowing particles in KOH electrolyte seems to indicate, that there is no optimal flow rate. Either the particles will not flow into the cell or they will flow into and out of the cell.

In addition, even if a proper flow rate can be achieved, it is envisioned that the balance for the proper flow rate would be further complicated when coupling the cells together to form a battery pack. The pressure drop across the battery and individual cells would vary (some cells will fill first), requiring an increase in the flow rate, thus filling more cells, but at the same time causing particles in the filled or partially filled cells to flow out of the cell.

The present invention includes two embodiments of a cell, one of which may be hydraulically recharged, and a second that may either be hydraulically or electrically recharged. Additionally, both embodiments utilize an improved method of convective flow of electrolyte during use (electrical discharge) and hydraulic recharge.

SUMMARY OF THE INVENTION

One embodiment of the present invention is a secondary metal air battery which can be hydraulically recharged. A second embodiment of the present invention of a similar secondary metal air battery that can be recharged either hydraulically or electrically.

It is an object of the present invention to provide a cell with electrical performance characteristics which can provide for the development of practical electric vehicles.

It is another object of the present invention to provide a cell which can be readily combined with other cells for use in an electric vehicle.

It is a further object of the present invention to provide a cell which can he easily manufactured.

It is another object of the present invention to provide a cell which can be manufactured from inexpensive, readily available materials.

It is another object of the present invention to provide a cell whose employment is safe and environmentally sound.

It is another object of the present invention to provide a cell that is environmentally sound to manufacture.

It is another object of the present invention to provide a cell wherein hydraulic emptying and refueling employs the same or a common mechanism.

It is another object of the present invention to provide a cell wherein the emptying and filling system has no moving parts.

It is another object of the present invention to provide a cell for which the system of hydraulic refueling can be automated.

These and other objects and features of the present invention will become more fully apparent when the following detailed description of the invention is read in conjunction with the accompanying drawings.

BRIEF DESCRIPTION OF THE FIGURES

FIGS. 1a and 1b are a front and edge sectional views, respectively, of a battery cell of the present invention.

DETAILED DESCRIPTION OF THE PRESENT INVENTION

Figure 2A:
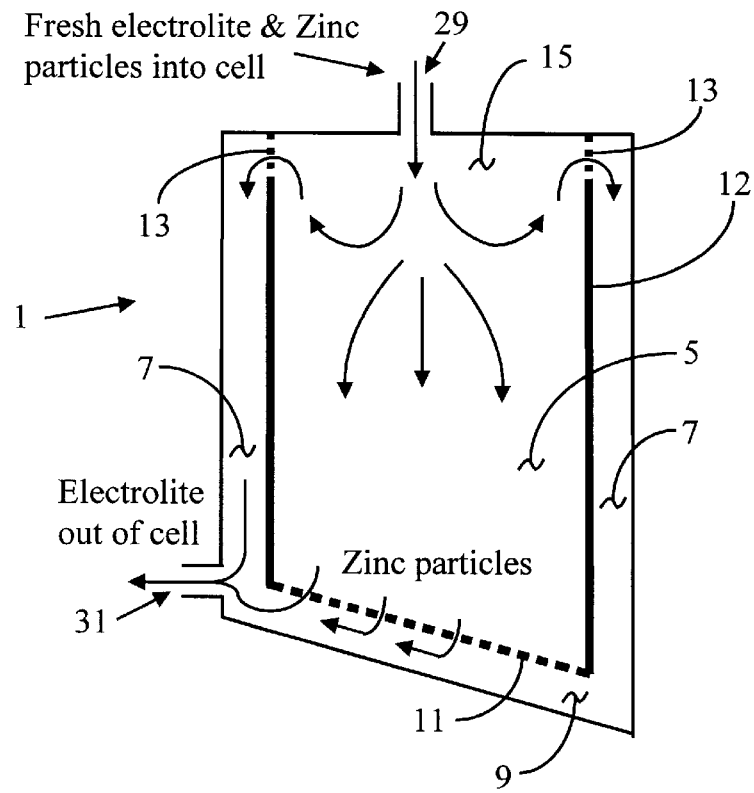
FIG. 2a is a front sectional view of the battery cell of FIGS. 1a and 1b being hydraulically refueled.

The present invention includes two embodiments. The first embodiment of the present invention is a secondary battery which has an inventive metal particulate anode and an air electrode. During electrical discharge of the cell, metal particles, preferably zinc, form a packed particulate bed. Recharging such a cell takes place through the hydraulic replacement of spent electrolyte and particles. Metals other than zinc could be used. The general requirement is that the metal must be capable of reaching a stable surface oxide in air or water, can form an aqueous solution of the metal salt and has a negative standard electrode potential (e.g., iron, aluminum, etc., excluding copper).

The second embodiment of the present invention is similar to that of the first embodiment in that the second embodiment includes a bifunctional air electrode, instead of the air electrode of the first embodiment. This variation provides the ability to recharge the cell of the second embodiment either through hydraulic replacement of spent electrolyte and particles or by recirculating the electrolyte and reversing the current to electrically recharge the cell. Here, also, a metal with the characteristics listed in the previous paragraph could be used in place of zinc.

FIGS. 1a and 1b illustrate the construction, and delivery of electrical current during operation, of a cell of either embodiment of the present invention. As can be seen in FIGS. 1a and 1b, cell 1 of the present invention has a distinctive sloping bottom 3 at an angle θ to horizontal, and defines two internal chambers, an air flow chamber 23 and an anode chamber 4. In FIG. 1a it can be seen that anode chamber 4 is divided into several regions. To define a central particulate region 5, side panels 12 of a chemically neutral material (e.g., phenolic plastic) are placed vertically and spaced apart from the outer walls of the cell to also create side channels 7 and bottom channel 9. Near the top ends of each of side panels 12, side panels 12 are pierced to form a grating 13 opposite a top central region 15 with the hole size of that grating being small enough so that the zinc particles can not pass through them. Additionally, spaced apart from sloped bottom 3 is a bottom grating 11 of a chemically neutral material (e.g., phenolic plastic) to create bottom channel 9, again with the grating holes small enough so that the particles can not pass through bottom grating 11.

In FIG. 1b in can be seen that anode chamber 4 is formed between a copper current collector 17 on the outside and a Celgard diaphragm 19 internal to cell 1. Then, in contact with Celgard diaphragm 19, there is air electrode 21 (bifunctional air electrode in second embodiment) that is adjacent air flow chamber 23. Additionally, air flow chamber 23 has a bottom air intake port 25 and a top air outlet port 27.

Discharge

Thus during normal operation, when current is being provided from cell 1, that current is provided between copper current collector 17 and air electrode 21 (an air electrode of the first embodiment of the present invention and a bifunctional air electrode for the second embodiment of the present invention). Air is forced through air flow chamber 23 from intake port 25 to outlet port 27 either with a fan (not shown) or by movement of cell 1 (e.g., in a vehicle), or both, one assisting the other. Additionally, the convective flow of the KOH electrolyte within anode chamber 4 is down through the particulate bed in central region 5, through bottom grating 11 into bottom channel 9 then up through side channels 7, through side gratings 13 into top central region 15 and again into the particulate bed in central region 5.

When current is being drawn from cell 1, zinc dissolves into the electrolyte, resulting in a redox reaction. An electrical current is produced by this reaction in the current collector/feeders. Simultaneously, the metal discharge products are also dissolved in the electrolyte and form a high density solution in the interstices of the particle bed. This denser solution sinks towards the bottom of the cell, generating convection forces as described above in reference to FIGS. 1a and 1b. These forces send the less dense active electrolyte material upwards through the bottom and side channels 9 and 7, respectively, towards the top of the metal particle bed. Thus, during operation zinc continues to be dissolved and produces an electrical current. Slopping bottom 3 of anode chamber 4 has been provided to cause agitation of the particles within central particulate region 5 during the convective flow of the electrolyte during emptying to assist in minimizing the number of metal particles that stick together. From flow rate calculations it has been determined that the most effective range of angle θ is 30° to 70°, however larger or smaller angles will also contribute to the agitation of the particles and thus reduce the probability of them sticking together.

Hydraulic Recharge

The present invention overcomes the difficulties of the prior art technology and provides a simple hydraulic emptying/ refueling system. Any sufficiently high flow rate will fill and empty the cell and additionally, refueling and emptying are not accomplished by moving parts in the cell or battery system but by controlling the direction of flow, which is dealt with outside the battery system.

Since high flow rates are permitted, rapid refueling is possible. Additionally, the system of the present invention is applicable to other types of batteries, for example iron-air, and also electrically/hydraulically recharged zinc-air cells.

Figure 2B:
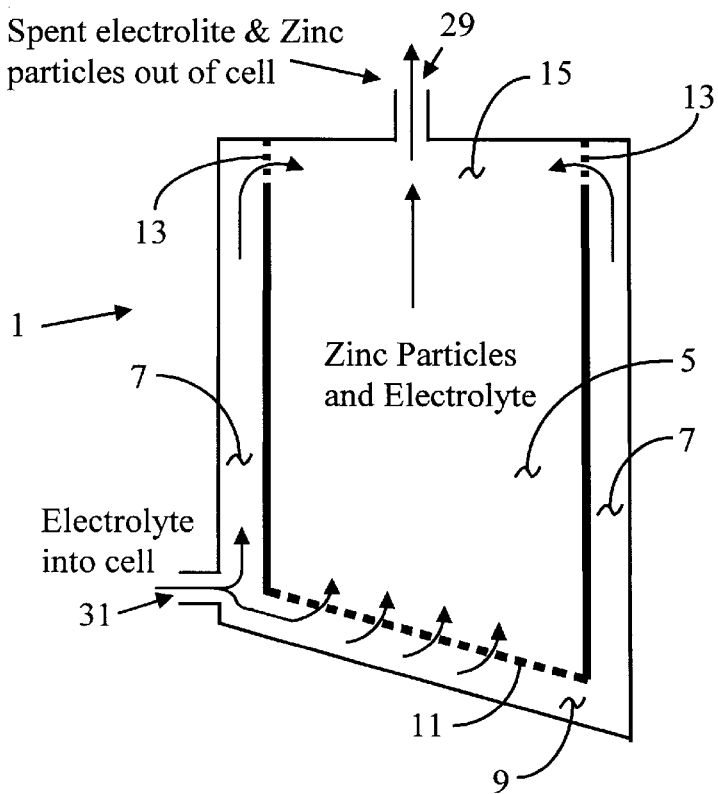
FIG. 2b is a front sectional view of the battery cell of FIGS. 1a and 1b being hydraulically emptied.

FIG. 2b illustrates the hydraulic emptying phase of the recharging of anode chamber 4 of cell 1. To empty, or flush the used particles from central particulate region 5, a fluid (e.g., water or new electrolyte) is pumped into bottom channel 9 through a lower anode chamber port 31. Since that electrolyte is under pressure it flows upward through both side channels 7 and central particulate region 5. The upward flow of the electrolyte, together with the angle, e, of slopping bottom 3, agitates the spent zinc particles in central particulate region 5 forcing the electrolyte/zinc particle slurry out of anode chamber 4 through upper anode chamber port 29. As a result of gratings 13 and 11 the zinc particles have no other path to follow except to be exited through upper anode chamber port 29. The jets of fluid pumped into anode chamber 4 from the bottom, coupled with the sloped cell bottom, generates a stirring action to loosen and break up agglomerated particles.

In FIG. 2a the refueling phase of the hydraulic recharging of cell 1 is illustrated. In this phase of operation, a slurry of fresh electrolyte and zinc particles is pumped into anode chamber 4 through upper anode chamber port 29. As this combination enters anode chamber 4, the electrolyte flows into and downward through central particulate region 5, as well as side channels 7, exits central particulate region 5 through bottom grating 11 into bottom channel 9 where it is joined by the downward flowing electrolyte from side channels 7 and exits lower anode chamber port 31. The zinc particles on the other hand are trapped in central particulate region 5 by gratings 13 and 11. Here too the flowing electrolyte and the bottom slope of anode chamber 4 causes a stirring of the zinc particles as they enter the cell thus keeping the zinc particles from becoming too densely packed in central particulate region 5. Once the full complement of fresh zinc particles has been directed into central particulate region 5, lower anode chamber port 31 is closed to retain the electrolyte within anode chamber 4, and no additional electrolyte and zinc particles are passed through upper anode chamber port 29. Additionally, to prevent spillage from anode chamber during use of the battery, top anode chamber port 29 is also closed.

Figure 4:
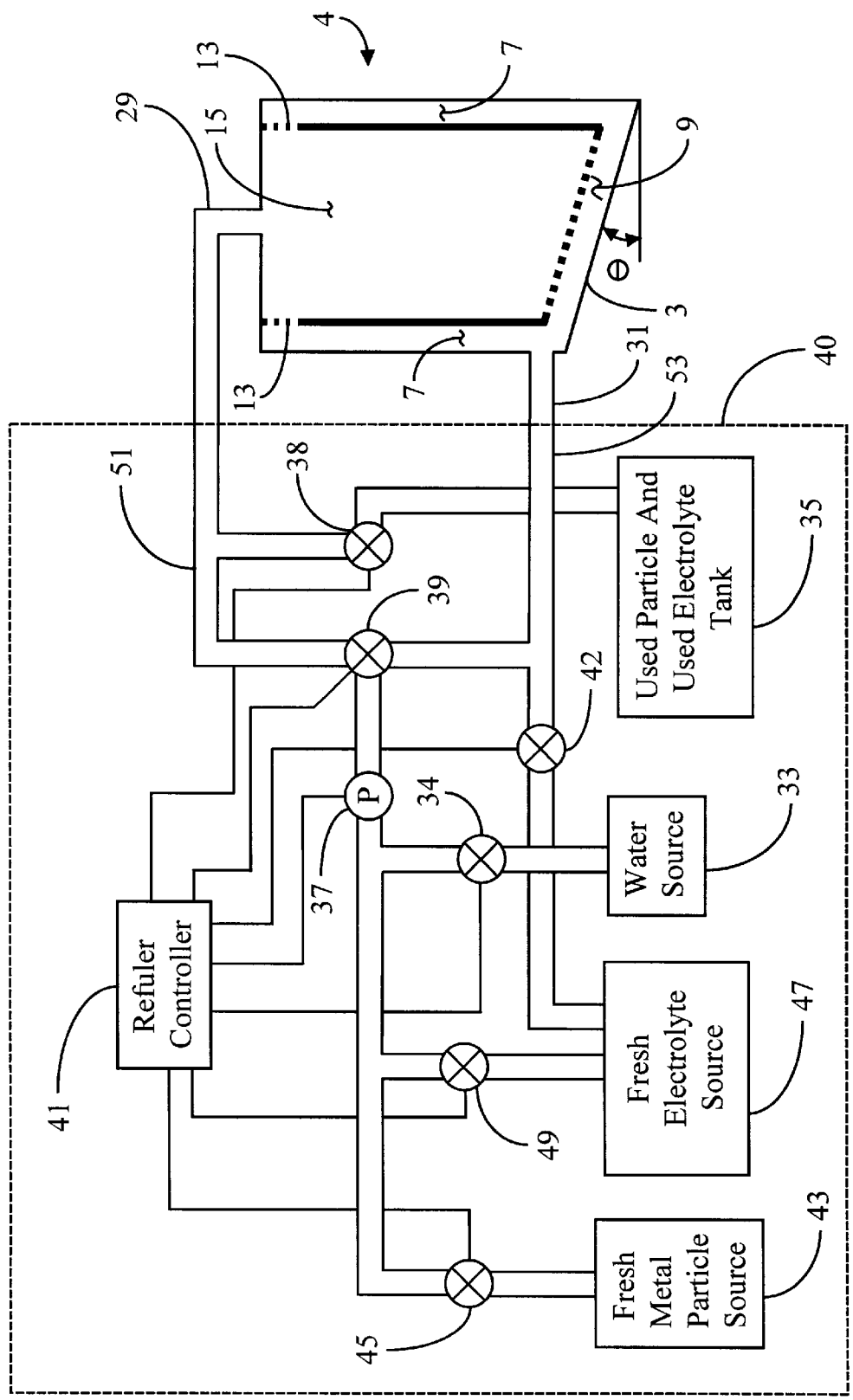
FIG. 4 is a simplified schematic representation of a refueling station for refueling a metal/air battery of the present invention.

FIG. 4 provides a simplified schematic representation of a refueling station 40 for a metal/air battery of the present invention. Refueling station 40 includes a water source 33 coupled to one port of a first electrically controllable valve 34; a fresh electrolyte source 47 coupled to one port of a second electrically controllable valve 49; a fresh metal particle source 43 containing a slurry of electrolyte and metal particles coupled to one port of a third electrically controllable valve 45; a used particle and electrolyte tank 35 coupled to one port of a fourth electrically controllable valve 38; a pump 37 having one port coupled to the common port of a three position valve 39 and the other port of pump 37 coupled to the second port of each of valves 34, 45 and 49; a refueler controller 41 electrically connected to each of the valves 34, 38, 39, 45, 42 and 49, as well as pump 37 to control the flow of particles and electrolyte into and out of anode chamber 4 of a metal/air battery; and interconnecting tubing to connect the other port of valve 38 and to one of the two controlled ports of valve 39 to tubing port 51 and the second of the two controlled ports of valve 39 to tubing port 53, with tubing ports 51 and 53 disposed to be coupled to upper and lower anode chamber ports 29 and 31, respectively.

Refueler controller 41 is programmed so that before the start of each phase of the refueling process (i.e., emptying and refueling) all valves are closed to prevent cross-contamination of the various sources (33, 43 and 47) with spent metal particles and used electrolyte.

During the emptying phase, valve 39 is switched by refueler controller 41 to provide a path for water or fresh electrolyte to lower anode chamber port 31, then either valve 34 or 49 is opened by controller 41, followed by valve 38 being opened by controller 41 to provide a path for the used electrolyte and spent particles from upper anode chamber port 29 to tank 35. With valves 34 or 49 and 38 and 39 in those positions, pump 37 is activated to pump either water or fresh electrolyte from source 33 or 47 into lower port 31, thus forcing the used electrolyte and spent particles out of upper port 29 and into tank 35. After sufficient time has been provided to complete that emptying, or flushing action, pump 37 is stopped and all valves are closed.

Next, to initiate the refueling phase, valve 39 is switched to connect pump 37 to upper port 29, then valves 45 and 49 are opened to make the contents of metal particle source 43 and fresh electrolyte source 47 available to pump 37, next valve 42 is switched to connect lower port 31 to fresh electrolyte source 47, and finally pump 37 is activated to begin the flow of metal particles and fresh electrolyte into anode chamber 4 through upper port 29. During this operation, as discussed above, electrolyte continues to flow through anode chamber 4 returning to fresh electrolyte source 47 until sufficient fresh metal particles are deposited into region 15 of anode chamber 4. Then, as in the emptying phase, controller 41 stops pump 37 and closes all valves thus trapping fresh metal particles and fresh electrolyte in anode chamber 4.

Electrical Recharge

Figure 5:
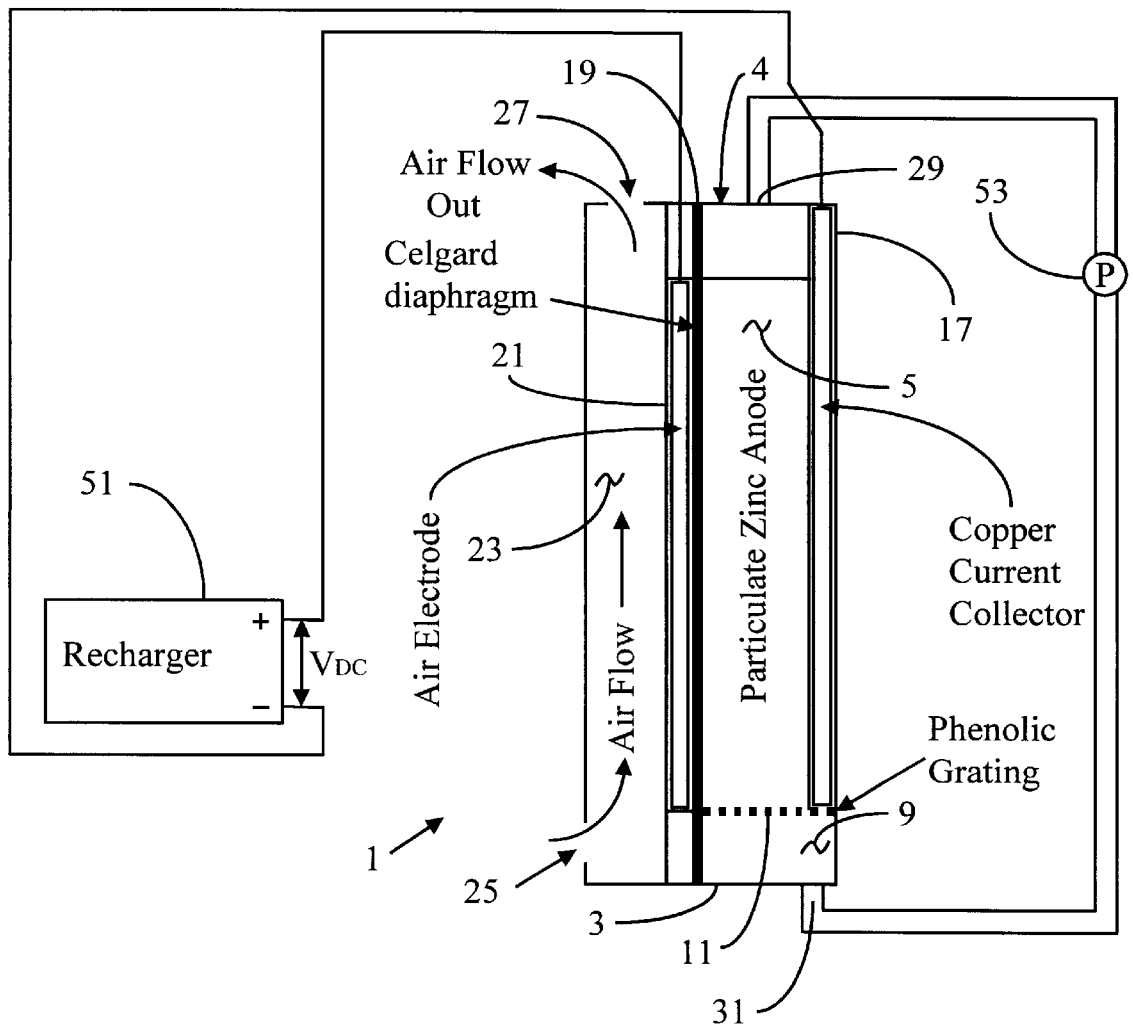
FIG. 5 is a simplified schematic diagram of an electrical recharging system for a metal/air battery of the present invention.

In the second embodiment of a metal/air battery cell 1 of the present invention (as shown in FIG. 5) electrical recharging of that cell is accomplished by reversing the direction of current flow through that cell. That is achieved by connecting a direct current power supply (recharger 51) with the positive terminal to air electrode 21 and the negative terminal to copper current collector 17 with the voltage, $V_{DC}$, having a greater potential than the open circuit potential of the metal/air cell 1 when fully charged. In this way, zinc (or the metal being used—not available for aluminum) is deposited onto the particles within particulate region 5 while oxygen is generated at the bifunctional air electrode 21. Preferably a flow of electrolyte is maintained by a pump 53 in either direction between lower port 31 and upper port 29 while that deposition is taking place. However, pumping the electrolyte into lower port 31 and out of upper port 29 must be at a flow rate that is insufficient to force particles out of the cell through upper port 29. In either direction the electrolyte can be circulated at a flow rate that is sufficient to loosen and stir the particles so that they have little tendency to adhere to each other as the zinc (or other metal) is plated on the particles. Flow could alternatively be solutal natural convection caused by the density differences occurring in the electrolyte. That convective flow would then be up through the central particulate region 5, through gratings 13 into side channels 7 and down to bottom channel 9, and then up through grating 11 back into central particulate region 5.

FIGS. 6a through 8c illustrate two additional flow control mechanisms that are automatically activated during the emptying of the metal-air battery of the present invention. Each of those flow control mechanisms is provided to restrict the flow of electrolyte through side channels 7 of the metal-air battery of the present invention during emptying.

Figure 6A:
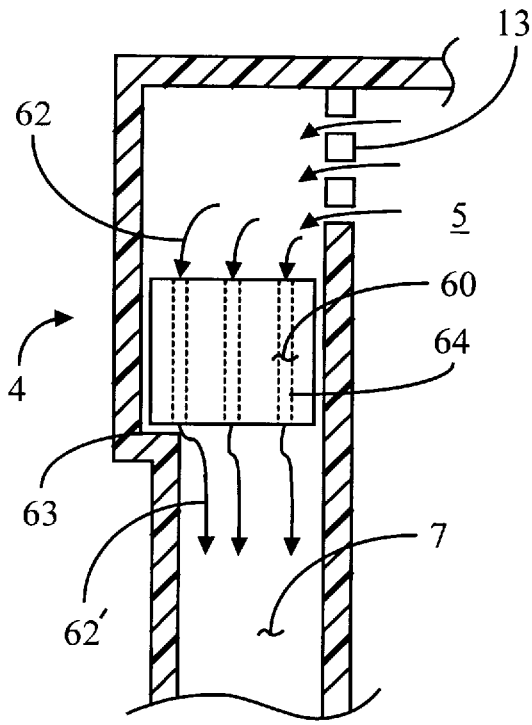
FIGS. 6a, 6b and 6c are partial cross-sectional views of the anode chamber of the metal-air battery of the present invention to illustrate one type of flow control mechanism to restrict flow up the side channels of the battery during hydraulic emptying of the battery of the present invention.
Figure 6B:
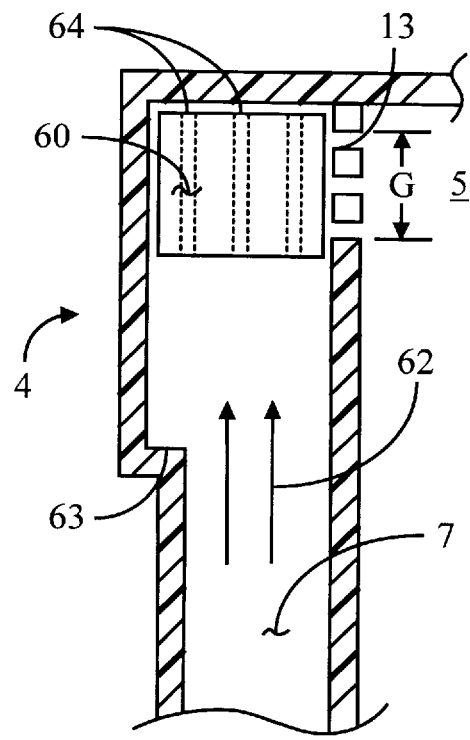
Figure 6C:
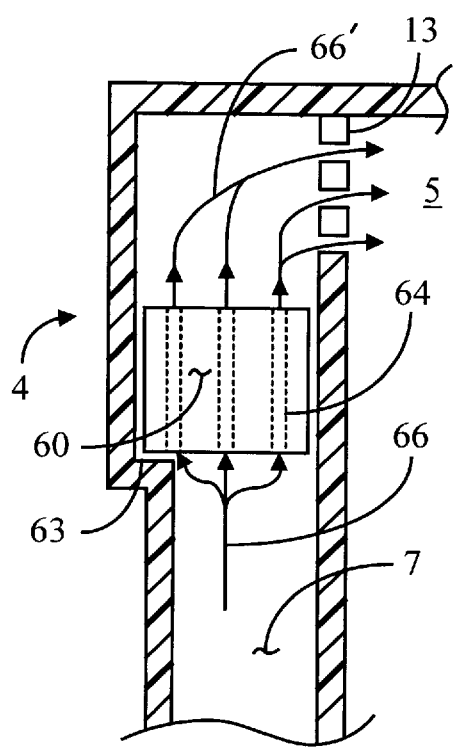

In FIGS. 6a through 6c the upper portion of one side channel 7 of anode chamber 4 is illustrated. In this upper portion of side channel 7 the horizontal cross-sectional shape perpendicular to the figure is larger than that of the lower portion of side channel 7 thus forming a shoulder 63. Located within that upper portion of side channel 7 is a flow restrictor 60 that has a horizontal cross-sectional shape perpendicular to the figure that is slightly smaller and substantially the same as that of the upper portion of side channel 7.

Figure 7A:
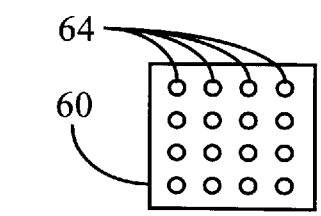
FIGS. 7a and 7b are top and side plan views of the flow control mechanism incorporated into FIGS. 6a, 6b and 6c.
Figure 7B:
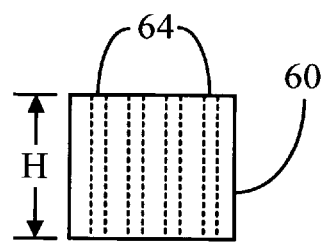

In FIGS. 7a and 7b flow restrictor 60 is shown in a plan top and side view, respectively, assuming that upper flow channel 7 has a rectangular or square cross-section. If side channel 7 has a different cross-sectional shape, then the top of flow restrictor 60 would reflect that shape. In these views it can be seen that flow restrictor 60 has numerous small passages 64 therethrough from top to bottom, and a height of H. In FIG. 6b it can be seen that grating 13 on the inside of side channel 7 has a height of G with height H being equal to, or preferably greater that G, the reason for which will become clear form the discussion below.

Returning to FIGS. 6a through 6c the operating condition represented by each figure first needs to be stated; i.e. FIG. 6a illustrates refueling, FIG. 6b illustrates emptying, and FIG. 6c illustrates normal use for delivering electrical power.

The refueling operation in FIG. 6a corresponds to that shown in FIG. 2a where the fresh electrolyte and metal particles are deposited into anode chamber 4 through upper anode chamber port 29 (FIG. 2a). As that occurs some of the electrolyte flows (62) through grating 13 into the upper portion of side channel 7 with that flow exerting pressure on the top surface of flow restrictor 60 and holding it in position against stop 63. Flow 62 continues through passages 64 and into the lower portion of side channel 7 as flow 62'.

During emptying of anode chamber 4 (see FIGS. 6b and 2b) it is desirable to maximize the flow through central particulate region 5 to improve the efficiency of the flushing of the spent particles from region 5. To improve that efficiency, it is desirable to minimize the flow of electrolyte through side channels 7. That is accomplished, as illustrated in FIG. 6b, with the pressure 64 of the electrolyte being inserted into lower anode chamber port 31 being exerted on the bottom surface of flow restrictor 60 thus forcing it to the top of side channel 7. In this position, flow restrictor 60 is directly opposite grating 13, no electrolyte can flow through passages 64 into grating 13 since they are perpendicular to grating 13, and since the height, H, of flow restrictor 60 is equal to or greater than the height, G, of grating 13, the flow of electrolyte through grating 13 is minimized.

Then in FIG. 6c, the situation during normal operation of the metal-air battery (i.e., delivering power), flow restrictor 60 is in the same position that it was in FIG. 6a, however the flow of electrolyte in side channel 7 is in the opposite direction. This is possible since the force of the upward flow of electrolyte in side channel 7 is only that of the normal convective flow of the electrolyte which is insufficient to push flow restrictor 60 to the top of side channel 7. Thus, the upper flow 66 of electrolyte proceeds through passages 64 in flow restrictor 60 and continues as flow 66'.

Thus, to achieve this operation, flow restrictor 60, in addition to having to be made of a material that is non-reactive to the electrolyte (e.g., rubber, plastic, glass, etc.), has to have a weight and obstructed surface area on the bottom surface that will cause the lifting of flow restrictor 60 to the top of side channel 7 during emptying while remaining below that position during normal delivery of power. Thus, the weight and restricted surface area of flow restrictor 60 must be selected so that the pressure of the electrolyte flow rate, during normal operation of the battery, exerted on the bottom of flow restrictor 60 is such that it does not lift flow restrictor, while the pressure of the electrolyte flow rate during emptying of the cell is sufficient to raise flow restrictor 60 to the top of side channels 7.

Figure 8A:
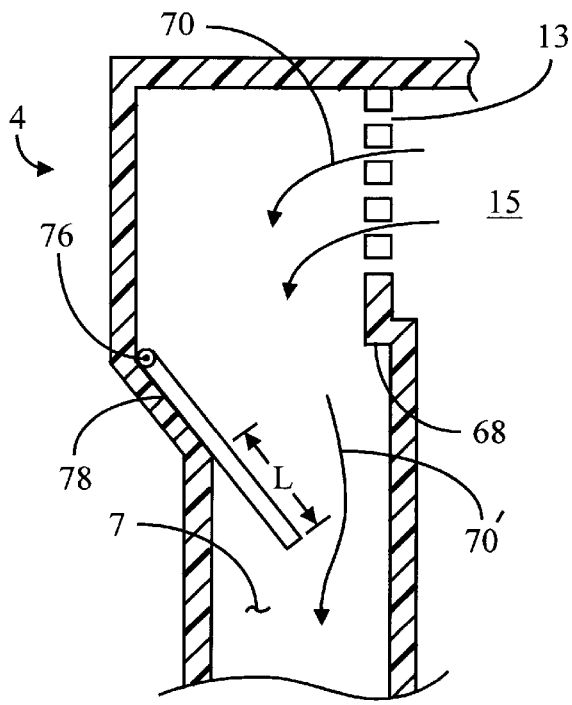
FIGS. 8a, 8b and 8c are partial cross-sectional views of the anode chamber of the metal-air battery of the present invention to illustrate a second type of flow control mechanism to restrict flow up the side channels of the battery during hydraulic emptying of the battery of the present invention.
Figure 8B:
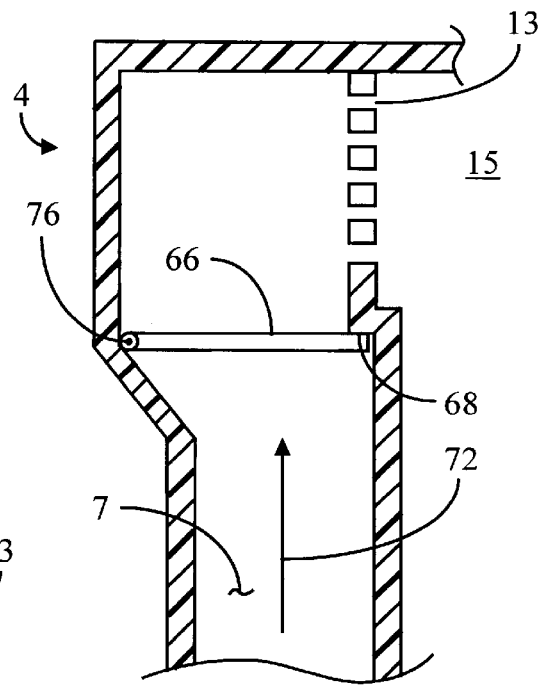
Figure 8C:
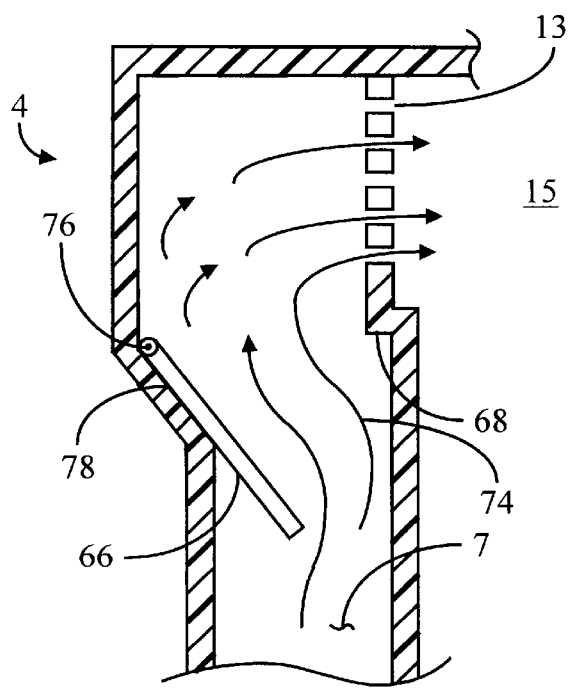

FIGS. 8a through 8c illustrate an alternative flow restriction system with those figures organized in the same functional order as are FIGS. 6a through 6c. In this configuration there is a downward facing seat 68 on the inside surface of side channel 7 and a sloping portion 78 of the outer surface of side channel 7. The length and position of that slope is selected to that the upper portion os side channel 7 has a larger horizontal cross-section than the lower portion of side channel 7. A the top of that slope a hinge 76 captures flow restrictor plate 66, with the surface shape of plate 66 being substantially the same as, and slightly smaller than that of the upper portion of side channel 7 with a length, L, of the free end of plate 66 extending beyond the lower edge of slope 78.

Thus, during refueling (FIG. 8a) plate 66 is resting on slope 78 with electrolyte flow 70 and 70' maintaining it in that position. In FIG. 8b plate 66 is forced upward into contact with stop 68 by the pressure 72 of electrolyte during the emptying operation. Finally, in FIG. 8c (normal operation of the battery) plate 66 is again shown in the rest position against slope 78 since the force of flow 74 of the electrolyte is not strong enough to raise plate 66. In this configuration the weight of plate 66 has to be balanced against the combination of the surface area of the length, L, of plate 66 that extends beyond slope 78 together with the differences in electrolyte flow pressures during refueling and normal operation of the battery for proper operation of flow restrictor plate 66. Also, as with flow restrictor 60 of FIGS. 6a through 7b, plate 66 has to be made of a material with the same restrictions.

EXAMPLE 1

In a first example, a cell without electrodes was built and various types of particles were pumped into and out of the cell—Fisher 30 mesh zinc needles, 0.5–0.8 mm cut wire zinc particles, and 0.5–0.8 mm cut wire copper particles. These cells filled and emptied within 10 seconds.

EXAMPLE 2

Figure 3:
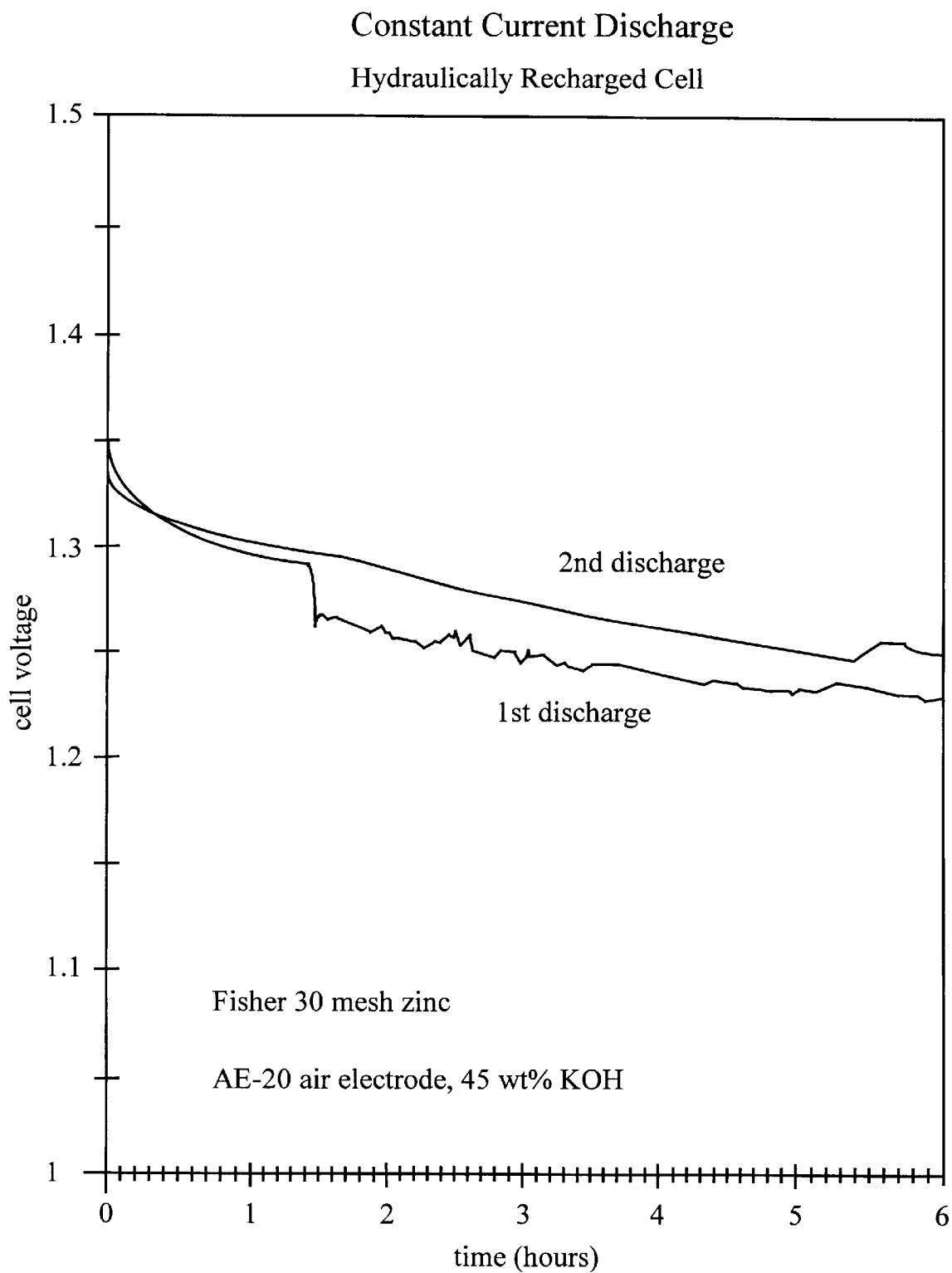
FIG. 3 is a graph that illustrates the experimental results observed for a battery cell of the present invention.

In Example 2 an actual cell with electrodes was constructed. The cell was first assembled empty of zinc and electrolyte, then hydraulically filled and discharged for 6 amp-hr. The cell was then emptied and refilled hydraulically. A second discharge was carried out and the results were compared with the first discharge (FIG. 3). There was no significant difference in discharge between the first and second filling, thereby proving that hydraulic recharging of the present invention works.

There may, of course, be variations on the materials used and the construction details of the present invention, as well as the refueling system, disclosed herein. For example, in lieu of the metal particles that have been referred to above, metal coated particles, e.g., plastic beads, could alternatively be used. Other variations will also be obvious for the invention that has been disclosed here.

Therefore, it will be recognized by those skilled in the art that the above description may not be the only possible description, or the most accurate description of the theory of this device. It is intended that this disclosure will not only protect what is specifically disclosed here, but also obvious variations of the ideas outlined herein. Thus, the protection afforded by this patent is only to be limited by the scope of the claims which follow, and not the scope of what was disclosed herein.

We claim:

1. A hydraulically rechargeable metal air battery to be selectively filled with metal particles and an electrolyte, said battery comprising:

a cell casing including a separating membrane to divide said cell casing into an anode chamber and a cathode chamber;

said anode chamber having a top, a pair of vertical side walls, a pair of end walls with one of said end walls adjacent said separating membrane, and a sloping bottom portion defining an interior space therebetween, said anode chamber disposed to receive electrolyte therewithin and including:

a pair of chemically inert side panels, each of said side panels spaced apart from a different one of said pair of vertical side walls of said anode chamber, a bottom end of each of said side walls spaced apart from said sloping bottom portion of said anode chamber, and a top end of each of said side panels, along a selected length thereof, defining a grating having holes of a selected size therethrough;

a chemically inert bottom grating connecting the bottom end of each of said pair of side panels having holes of a selected size therethrough;

wherein:

said pair of side panels and said bottom grating define side and bottom channels between themselves and said pair of vertical walls and bottom portion of said anode chamber;

a central particulate region defined between said pair of side panels, above said bottom grating and below said gating in said top end of each of said pair of said panels, said central particulate region disposed to receive said metal particulate; and said selected size of said holes in said side panels and in said bottom grating being selected to be smaller than the smallest particle size of said metal particles to prevent said particles from passing therethrough;

a first inlet/outlet conduit through said top of said anode chamber in direct communication with said central particulate region therewithin;

a second inlet/outlet conduit in said anode chamber in direct communication with said bottom channel;

a current collector/feeder adjacent said central particulate region and one of said end walls;

said cathode chamber defining an interior space having a top, a pair of vertical side walls, a pair of end walls with one of said end walls adjacent said separating membrane, and a bottom, said cathode chamber including:

an air electrode adjacent said end wall adjacent said separating membrane;

an air flow chamber;

an air inlet port opening into said air flow chamber; and an air outlet port opening from said air flow chamber;

wherein said air inlet and outlet ports are spaced apart for each other to maximize the air flow distance therebetween within said air flow chamber.

2. A hydraulically rechargeable metal air battery as recited in claim 1 further including a pump coupleable to one of said first and second inlet/outlet conduits to circulate the electrolyte through said anode chamber during emptying and refueling operations.

3. A hydraulically rechargeable metal air battery as recited in claim 1 wherein the slope of said bottom portion of said anode chamber is between 30° and 70° to horizontal.

4. A hydraulically rechargeable metal air battery as recited in claim 3 wherein said bottom grating is substantially parallel to said bottom portion.

5. A hydraulically rechargeable metal air battery as recited in claim 1 wherein said metal particles contain zinc.

6. A hydraulically rechargeable metal air battery as recited in claim 1 wherein said metal particles contain a metal that is capable of reaching a stable surface oxide in air or water, that forms an aqueous solution of a metal salt of that metal, and that has a negative standard electrode potential.

7. A hydraulically rechargeable metal air battery as recited in claim 1 wherein said metal particles have a non-reactive core with a metal coating the exterior of said core.

8. A hydraulically rechargeable metal air battery as recited in claim 1 further includes a pair of flow restrictors of a solid material each having an upper and a lower face, one flow restrictor for each of said side channels, and each flow restrictor being of a chemically inert material that is sized and shaped to substantially extend between said vertical side wall, said side panel, and said pair of end walls to fit within said side channel, said flow restrictor having a selected height between said upper and lower faces that is at least equal to said selected length of said grating in said side panel and less than a height of said side channel through which said flow restrictor can move without extending into said bottom channel, said flow restrictor defining at least one passage therethrough between said upper and lower faces;

wherein said flow restrictor permits flow through said side channel via said at least one passage therethrough when said upper face of said flow restrictor is spaced apart from the top of said side channel and blocks flow through said side channel when said upper face of said flow restrictor is above the upper extend of said grating in said side panel, said flow restrictor having a weight and a solid area of said lower face that are selected to permit a selected pressure exerted on said lower face by an upper flowing electrolyte in said side channel to push said flow restrictor to the top of said side channel.

9. A hydraulically rechargeable metal air battery as recited in claim 1:

wherein each side channel includes a downward sloping portion in one of said vertical side wall and said side panel that defines said side channel; said sloping portion having a selected length, and an upper and a lower transition point with respect to other portions of said one of said vertical side wall and said side panel in which said slopping portion is formed; in the other one of said vertical side wall and said side panel opposite said slopping portion defines a stop that protrudes into said side channel at a point below a lowest extent of said grating in said side panel and above said bottom channel; and further includes a pair of flow restrictor flaps of a solid, chemically inert material, one flow restrictor flap located within each of said side channels, and each flow restrictor flap having an upper and a lower face that is sized and shaped to substantially extend between said pair of end walls, and to extend between corresponding ones of said side walls and said side panels when said flow restrictor flap is closed; one edge of each of said flow restrictor flaps is flexibly coupled at said upper transition point of said slopping portion with a selected length of said flow restrictor flap extending beyond said lower transition point of said slopping portion when said lower face of said flow restrictor flap is in contact with said slopping portion;

wherein each of said flow restrictor flaps restricts flow through said side channel when another edge of said flow restrictor flap is in contact with said stop, said another edge is opposite said one edge of said flow restrictor flap; and to otherwise permit flow through said side channel; each of said flow restrictor flaps having a weight and said selected length that are selected to permit a selected pressure exerted on said lower face of said selected length of said flow restrictor flap by an upper flowing electrolyte in said side channel to push said flow restrictor flap upward to bring said another edge into contact with said stop to restrict flow through said side channel.

* * * * *